US005731693A

United States Patent [19]
Furmanczyk

[11] Patent Number: 5,731,693
[45] Date of Patent: Mar. 24, 1998

[54] POWER SUPPLY FOR CELLULAR COMMUNICATION STATIONS

[75] Inventor: Kaz Furmanczyk, Marysville, Wash.

[73] Assignee: Eldec Corporation (a Washington corporation), Lynnwood, Wash.

[21] Appl. No.: 735,779

[22] Filed: Oct. 23, 1996

[51] Int. Cl.⁶ .......................................... G05F 5/08
[52] U.S. Cl. ........................ 323/274; 323/284; 363/84; 307/64
[58] Field of Search ........................ 323/265, 273, 323/274, 275, 276, 282, 284; 363/84, 124, 125; 307/45, 46, 64, 65, 66, 80, 82, 151

[56] References Cited

U.S. PATENT DOCUMENTS

| | | | |
|---|---|---|---|
| 4,694,237 | 9/1987 | Hanson | 320/6 |
| 5,039,930 | 8/1991 | Collier et al. | 320/2 |
| 5,161,097 | 11/1992 | Ikeda | 363/124 |
| 5,291,383 | 3/1994 | Oughton | 363/17 |
| 5,532,914 | 7/1996 | Kageyama et al. | 307/82 X |
| 5,570,004 | 10/1996 | Shibata | 323/274 X |

Primary Examiner—Peter S. Wong
Assistant Examiner—Y. J. Han
Attorney, Agent, or Firm—Christensen O'Connor Johnson & Kindness PLLC

[57] ABSTRACT

An AC-to-DC converter and regulator normally receives power from an AC utility line and provides a stable DC output to a load, such as the power amplifier and transmitter of a cell site. The DC output, or a separate dedicated output from the converter, is used to charge a backup battery when AC power is available. If AC power is interrupted, the backup battery provides power to the load by way of a separate DC-to-DC differential converter. The battery is connected in parallel with the differential converter input, but in series with the differential converter output. Thus, the differential converter receives operating power from the battery, and outputs a voltage which is summed with the battery output to drive the load. A control circuit for the differential converter senses the voltage provided to the load, and supplies a signal to the differential converter to adjust its output as necessary to maintain the optimum aggregate output to the load.

2 Claims, 5 Drawing Sheets

POWER SUPPLY FOR CELLULAR COMMUNICATION STATIONS

FIELD OF THE INVENTION

The present invention relates to communication systems and power supplies therefor, particularly power supplies with battery backup for cellular applications.

BACKGROUND OF THE INVENTION

Rapid growth and competition in the cellular communications market has created additional requirements for power supplies for cellular stations, particularly small cellular stations, repeaters or enhancers, collectively referred to herein as "cell sites". A linear RF power amplifier and transmitter is a key component of the site, often consuming approximately ninety percent of the cell site power requirement. In normal operation, AC line power is available. An AC-to-DC power converter and regulator provides a stable DC output voltage for driving the power amplifier and transmitter. It is important that the power supply be reliable, because system down time is very costly to the provider. For the same reason, provision must be made for operation of the site when AC power is not available. In fact, air traffic usually increases during power outages. Consequently, battery backup systems are required to provide a DC voltage directly to the power amplifier and transmitter when the AC fails. To ensure that the battery backup is fully charged during times of AC power failure, in known systems the AC-to-DC power converter output is used to charge the battery during availability of AC power. The DC charging voltage is provided from the same DC bus used to convey power to the power amplifier and transmitter.

In many instances, cell sites are becoming smaller due to limitation of available locations. Thus, volume, weight and even such factors as heat dissipation or cooling requirements are becoming important in the design of power supplies for cell sites. In addition, competition among service providers is increasing making cost an important factor. There is a continuing need to introduce more advanced power supply systems for cell sites, taking into consideration reliability, size, weight, heat generation and dissipation, uniformity of performance, and battery backup capabilities.

SUMMARY OF THE INVENTION

The present invention provides a reliable, low cost, small, lightweight power supply particularly adapted for use in a cell site of a cellular communications system, with substantial battery backup time. In the preferred embodiment, an AC-to-DC converter and regulator normally receives power from an AC utility line and provides a stable DC output to the load, such as the power amplifier and transmitter of a cell site. The DC output, or a separate dedicated output from the converter, is used to charge a backup battery when AC power is available. If AC power is interrupted, the backup battery provides power to the load by way of a separate DC-to-DC converter, referred to herein as a "differential converter." The battery is connected in parallel with the differential converter input, but in series with the differential converter output. Thus, the differential converter receives operating power from the battery, and outputs a small voltage sufficient to increase the battery output to the optimum operating range of the load. A control circuit for the differential converter senses the voltage provided to the load, and supplies a signal to the differential converter to adjust its output as necessary to maintain the optimum aggregate output to the load. For example, the battery voltage will decrease over time, and the differential converter therefore provides a voltage which increases over time. Since the differential converter generates only the incremental voltage needed to supplement the battery output, such as in the range of 1 volt to 5 volts as compared to the optimum aggregate output of about 26 volts, the differential converter can be a small, inexpensive converter that generates little heat. Consequently, few alterations are required for a small cell site power supply. Nevertheless, the battery backup time is increased greatly, and the load operates with optimum performance.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
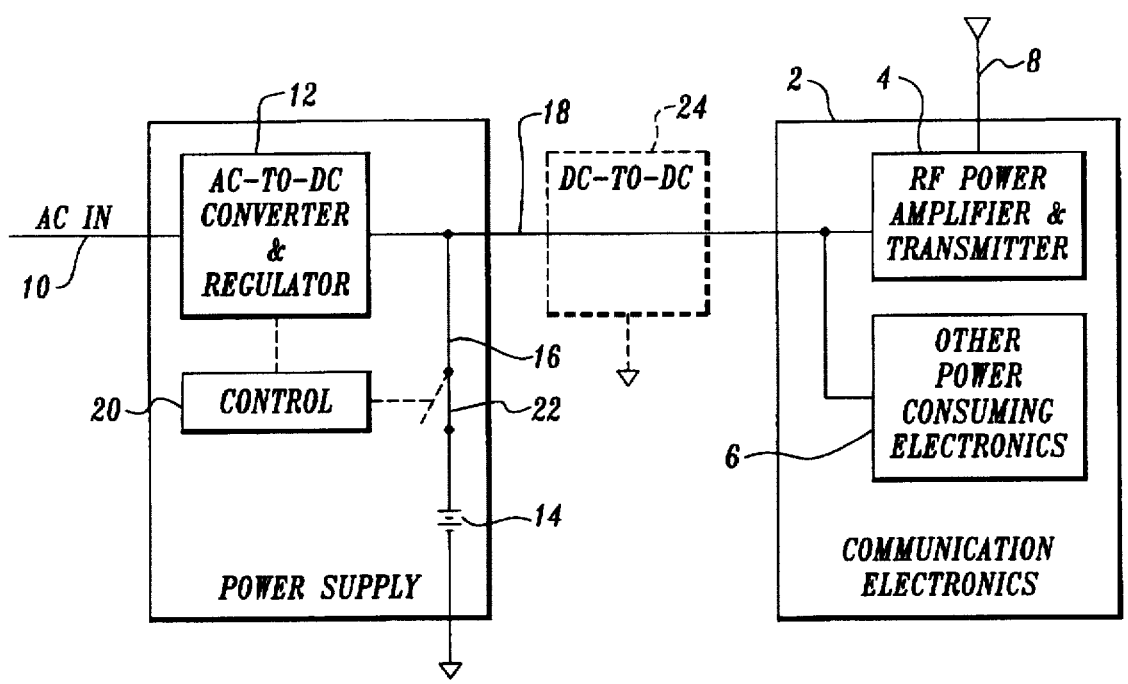
FIG. 1 is a block diagram of a cell site having a conventional power supply.

FIG. 1 illustrates in block diagram form the components of a representative cellular communications system cell site. The cell site includes the communication electronics 2 including an RF power amplifier and transmitter 4 and other power consuming electronics 6. The power amplifier and transmitter drives an antenna 8 and typically consumes a major portion of the power used by the entire cell site. During normal operation, power for the power amplifier and transmitter originates from an AC utility line 10 through an AC-to-DC power converter and regulator circuit 12. In case of power outage, a backup battery 14 is provided. The backup battery can receive appropriate charging current by a branch 16 from the same bus 18 by which power is supplied to the cell site electronics 2. In more sophisticated systems, the voltage supplied for battery charging is adjusted for optimally maintaining a full battery charge, such as by temperature compensation and so on. These and other control aspects of the power supply are represented by box 20 in FIG. 1. During battery operation, i.e., during power outages, a switch 22 is normally closed to connect the battery to the power supply bus or line 18. However, the control circuitry automatically opens the switch, cutting off the supply of power to the cell site electronics 2, if the battery voltage decreases to the point where damage to the battery may occur.

Due to the reliability of the utility power supply at line 10, it is only in unusual circumstances that the battery will be required to power the amplifier and transmitter. One result is that the power supply typically is designed based primarily on AC power being available, in combination with proper charging, maintenance, and supervision of the battery. For example, in a representative system, the RF power amplifier and transmitter maintains full performance when the DC power input is about 25.5 volts to about 26.5 volts. This range roughly corresponds to charging requirements for a nominal 24-volt lead acid battery. When AC power is discontinued, however, only the battery output voltage is supplied to the power amplifier and transmitter, less any line losses. At most, 24 volts is supplied initially. Consequently, even with the battery fully charged, the RF power amplifier and transmitter suffers from degraded performance, which may limit the traffic that can be handled by the cell site and adversely affect the range and quality. In addition, the output voltage of the battery will decrease over time. System shutoff due to the battery minimum safe voltage being reached will occur when the battery output voltage is about 21 volts. For a system using 20 amps, and two series-connected 12-volt valve regulated lead acid (VRLA) batteries having ratings of 50 amp: hours, the battery output would decrease from 24 volts to 21 volts in approximately two hours.

In practice, the actual battery backup time may be considerably less. Even with a fully charged battery, line losses in bus 18 result in less than 24 volts being delivered to the power amplifier and transmitter when AC power is first discontinued. In addition, the performance of the power amplifier degrades to an unacceptable point for input voltages below about 22 to about 23 volts, rather than the minimum safe battery voltage of 21 volts. Shutdown due to degraded performance of the power amplifier and transmitter can therefore occur before the minimum safe battery voltage is reached, i.e., in much less than the design condition of two hours.

To increase the battery backup capabilities of the power supply, more and/or larger backup batteries could be used. Nevertheless, the RF power amplifier and transmitter will operate with degraded performance-as the battery output voltage decreases and, if optimum charging and battery maintenance is to be achieved, even the initial battery output will be less than the voltage required for full performance. Further, the battery or batteries are not fully utilized, because the system still will shut down before the battery or batteries reach their minimum safe output voltages. Increasing the size or number of batteries also adds weight, volume and expense to the power supply.

Another approach is to provide an additional DC-to-DC converter 24, shown in broken lines in FIG. 1. Adding a converter has the advantage that the battery is fully utilized and can supply power with a voltage drop down to the 21 volt level, maximizing the battery backup time. Also, the RF power amplifier and transmitter operates throughout battery backup with full performance. A substantial increase in the actual battery backup time is obtained, but at additional expense, size, and weight, and with a requirement for greater heat dissipation due to the additional power conversion by the DC-to-DC converter 24. There also is the possibility of decreased reliability, because there is an additional component that may fail, and failure of the DC-to-DC power converter effectively eliminates power supply to the RF power amplifier and transmitter even when AC input power is present, resulting in shutdown of the cell site.

The present invention provides an even greater increase in effective battery backup time, but at much less expense, with less increase in weight, volume and heat generation, and without affecting the reliability of AC operation. In general, the power system in accordance with the present invention provides tightly regulated and conditioned DC power to sensitive electronic circuitry, particularly the RF power amplifier and transmitter for a cell site. Input power is taken from an AC utility line, or from a standard lead acid battery when AC power is not present. The system also maintains proper charging and supervision of the battery.

Figure 2:
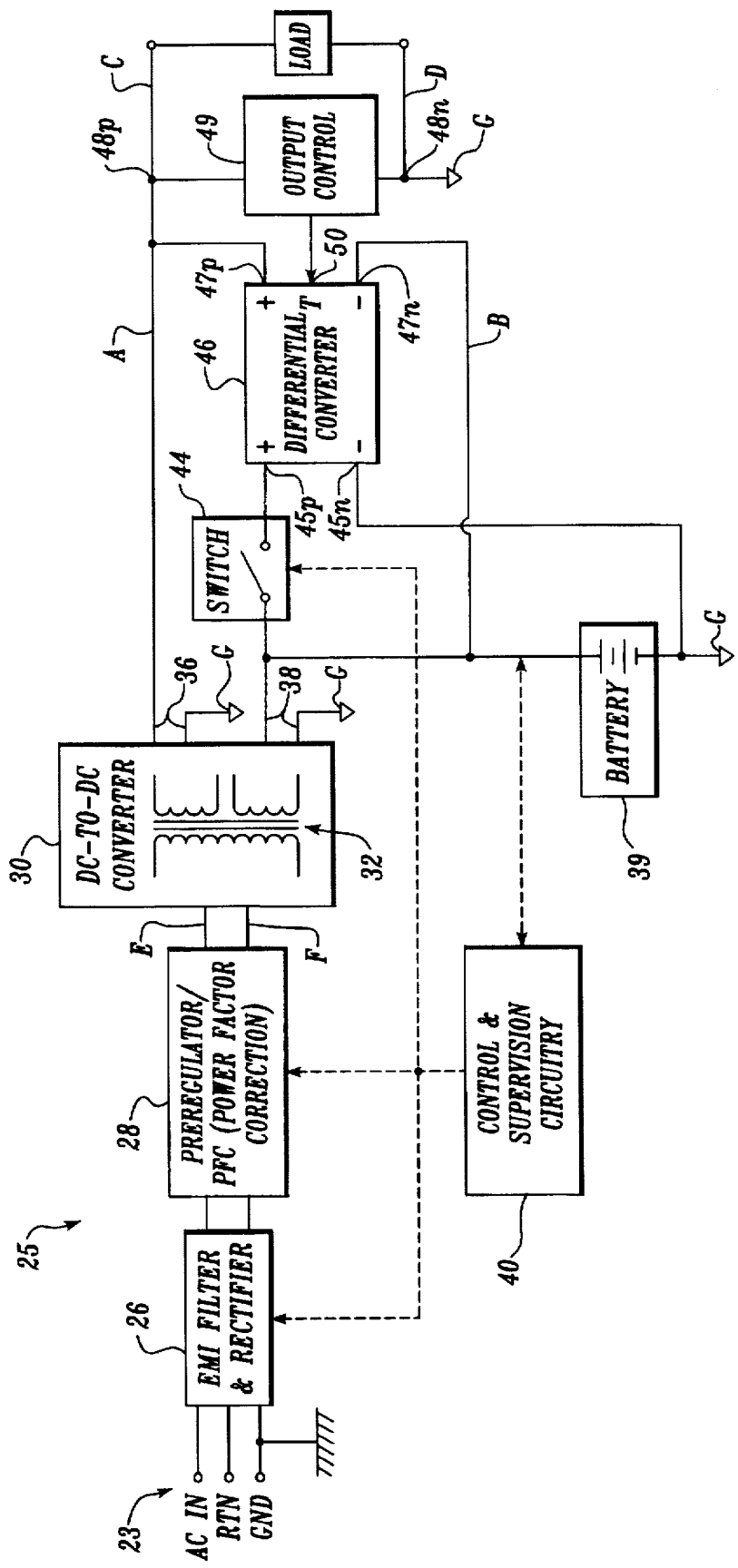
FIG. 2 is a block diagram of the circuit of a power supply for cellular communication stations in accordance with the present invention.

With reference to FIG. 2, terminals 23 represent AC utility line input to a power supply 25 in accordance with the present invention. Preferably the system is designed to operate for virtually all known AC utility power systems in the world, which can vary from 85 volts to 264 volts and 47 Hz. to 63 Hz. An EMI filter and rectifier circuit 26 prevents the high frequency noise naturally generated by switching power supplies from affecting other equipment via either radiation or conduction, and converts the AC power to an unregulated DC voltage in the range of 120 volts to 373 volts. Such filters and rectifiers are well known in the art.

The unregulated power from the EMI filter and rectifier 26 is supplied to a preregulator/PFC (power factor correction) circuit 28 which converts the unregulated DC voltage into; a regulated DC voltage in the range of 370 to 390 volts and provides conditioning. Without this circuit, the input current would be taken from the utility only in short pulses resulting in harmonic distortion of the AC power and very low power factor, usually below 0.7. Techniques used in this circuit preferably are based on known high frequency switch mode technology, but other active or passive methods can be used.

The regulated DC voltage from the preregulator/PFC circuit 28 is supplied to a conventional DC-to-DC converter and regulator 30. The high level (up to 390 volts DC) voltage is converted into a fully regulated output voltage, and is electrically isolated from the input. Preferably this converter uses known high frequency mode technology to efficiently process the power. The input-to-output isolation is achieved through a transformer 32. In the preferred embodiment, the DC-to-DC converter and regulator 30 has two outputs achieved by two taps off the transformer 32. The output at lines 36 provides the optimum regulated output voltage for drying the load, such as the power amplifier and transmitter at the cell site (typically about 26 volts DC). The output at lines 38 supplies the battery charging voltage for a standard 24 volt lead acid battery 39. With temperature compensation, the voltage at lines 38 will usually be between about 25 volts and about 28 volts.

Appropriate control circuitry 40 of conventional design ensures proper operation and protection to the main power circuits 26, 28 and 30. Such control and supervision circuitry also can have remote supervisory capabilities and outside alarms of abnormalities in the system operation.

As noted above, power supplied at lines 38 is used to charge a conventional lead acid battery or batteries 39 (24 volts nominal). In normal operation, i.e., in the presence of AC power, the battery and associated circuitry of the present invention do not affect the supply of power to the load by way of lines 36. An interruption in the AC power supply is detected by the control and supervision circuitry 40, which triggers closing a switch 44 such that power from the battery 39 is supplied to a "differential" DC-to-DC power converter 46. The input terminals 45n (negative) and 45p (positive) of the differential DC-to-DC power converter are connected in parallel with the positive and negative terminals of the battery, so that the battery provides the operating power for the differential converter. However, the output of the differential converter supplied at terminals 47n (negative) and 47p (positive) is connected in series with the battery. More specifically, as shown in FIG. 2, the negative terminal of the battery is connected to ground G; the positive terminal of the battery is connected to the negative output terminal 47n of the differential converter; the positive terminal 47p of the differential converter is connected to the positive terminal 48p of the load; and the loop is completed by the negative terminal 48n of the load being connected to ground. Thus, the differential DC-to-DC power converter 46 boosts the voltage supplied by the battery 39, but only insofar as necessary to supply the optimal regulated voltage to the load. In a representative embodiment, converter 46 can be a model VI-200 DC-DC converter available from Vicor Corporation of Andover, Mass. Since the differential converter produces only the differential voltage required to boost the battery output voltage to the optimum aggregate output voltage at terminals 48n (negative) and 48p (positive), the power requirements for the converter are low. For example, the total output power supplied at the terminals 48n and 48p can be as much as 1,000 watts, whereas the differential converter typically will process no more than 150 watts in order to boost the battery voltage from the range of 21–24 volts to the desired output of about 26 volts.

The differential converter 46 is under the control of an output controller 49 which senses the actual output power supplied at terminals 48n and 48p and sends an appropriate feedback signal to the differential power converter for adjustment of the differential voltage that it produces. The voltage generated by the differential converter is adjusted by the control signal which is supplied to a trim pin 50 of the converter. In this manner, the sum of the battery voltage and the differential converter output voltage maintains the desired system output voltage during AC power disruption, without affecting normal AC operation.

Figure 3:
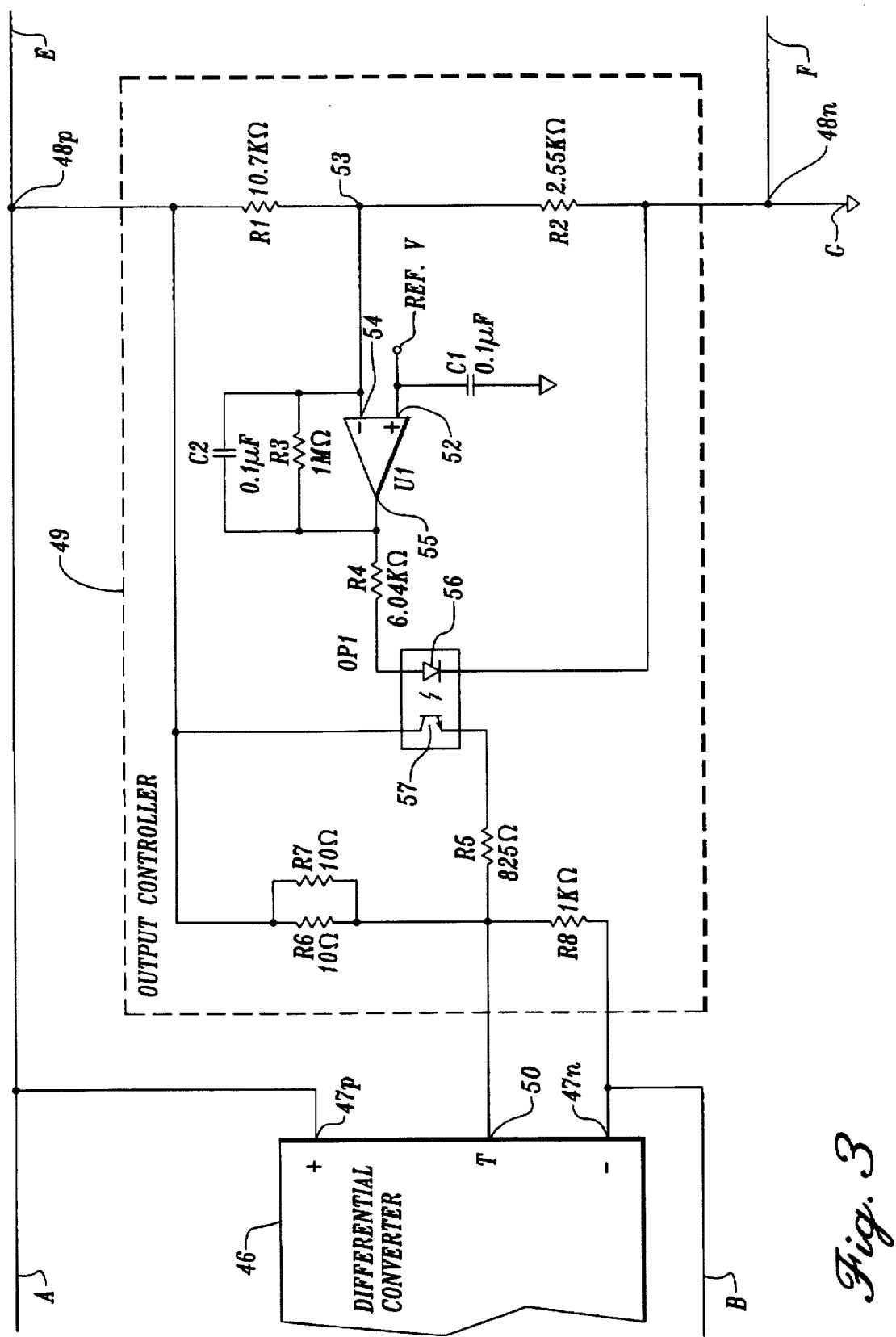
FIG. 3 is a circuit diagram of one component of the power supply of FIG. 2.

With reference to FIG. 3 which is an enlarged and more detailed diagram of the circuitry between points A, B, C, and D, the control circuit 49 operates as follows: resistors R1 and R2 are used to sense the system output voltage at terminals 48n and 48p and divide it at a junction 53 to a level comparable with a reference voltage. The reference voltage V (preferably 5 volts) is generated in the control and supervision circuitry and is applied at the noninverting input 52 of an operational amplifier U1. A capacitor C1 coupled between the noninverting input and ground provides local filtering for the reference voltage.

The junction 53 of voltage divider R1 and R2 is connected to the inverting input 54 of the operational amplifier U1. If the system voltage at terminals 48n, 48p drops below the predetermined optimum voltage (26 volts in the representative embodiment), the voltage at the inverting input 54 drops below the reference voltage (5 volts), which causes amplification of the small differential signal between the noninverting and inverting inputs into a higher output voltage signal at the amplifier output 55. The presence of voltage at the output of the amplifier will produce current flow through an optocoupler diode 56. The current in the diode is proportional to the voltage at the amplifier output and causes a corresponding emission of light by the diode. Intensity of the light emitted by the diode in the optocoupler will turn on an associated transistor 57, and generate a control signal to the trim pin 50 of the differential converter 46. The differential converter reacts to the control signal by increasing its output voltage (to compensate for the lower battery voltage) which brings the system output voltage at terminals 48n, 48p to the required level.

Feedback capacitor C2 and resistor R3 for the amplifier U1 filter the feedback signal to slow the response of the control circuit and ensure proper timing. Resistors R4 and R5 provide proper sizing of the current level in the control circuit. Resistors R6, R7, and R8 offset the initial bias to the trim pin of the differential converter.

Figure 4:
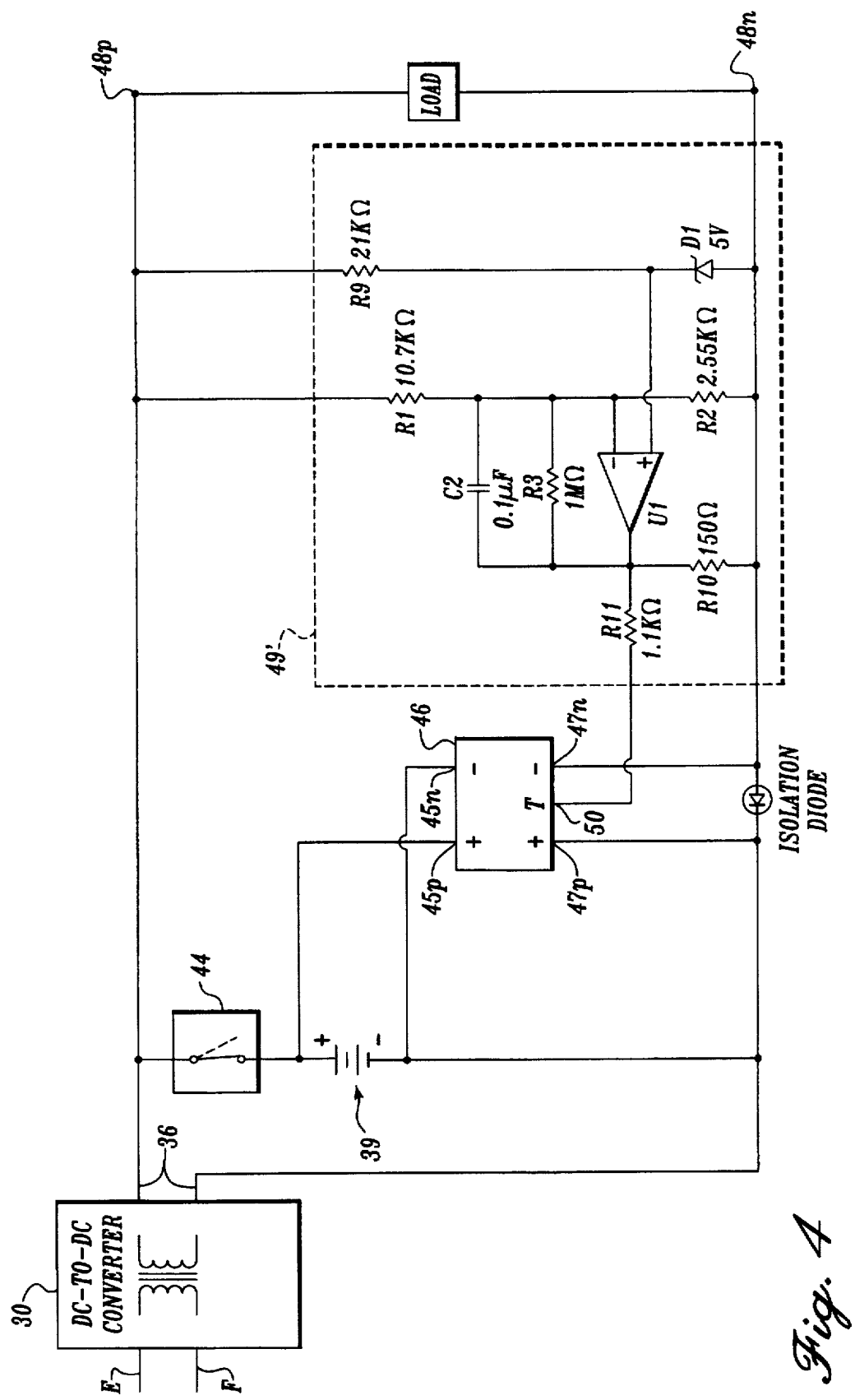
FIG. 4 is a block diagram of an alternative embodiment of a power supply for cellular communication stations in accordance with the present invention.

In the illustrated embodiment, the differential converter is placed in the positive output branch from the battery and it is therefore desirable to isolate the sensing circuitry from the control signal, due to the different reference levels of the signals. However, the differential converter could be placed in the return branch as shown in FIG. 4, in which case the isolating optocoupler could be omitted. In the embodiment of FIG. 4, the output of the battery 39 is still connected in parallel with the input terminals 45n and 45p to the differential converter 46, whereas the output of the differential converter output at terminals 47n and 47p is connected in series with the battery (but at the negative side). More specifically, the output loop is configured as follows: the negative terminal 48n of the load is connected to the negative output terminal 47n of the differential converter; the positive output terminal 47p of the differential converter is connected to the negative terminal of the battery; and the positive terminal of the battery is connected to the positive terminal 48p of the load. The output control circuit 49' still senses the aggregate output at terminals 48n, 48p which, after appropriate voltage division by resistors R1 and R2, is supplied to the inverting input of the operational amplifier U1. The noninverting input of the operational amplifier receives the reference voltage (preferably 5 volts) supplied by way of a resistor R9 and zener diode D1. The feedback loop for the operational amplifier, including resistor R3 and capacitor C2, is identical to that previously described. Resistor R10 provides the offset and R11 provides proper sizing of the current level in the control circuit for provision to the trim pin 50 of the differential DC-to-DC converter 46.

Another modification illustrated in FIG. 4 is the use of a single output from the AC-to-DC converter for normally supplying the output voltage to the load and for battery charging purposes. Switch 44 is normally closed for battery charging during AC operation, and is opened only when the minimum safe battery voltage is reached during battery operation.

Figure 5:
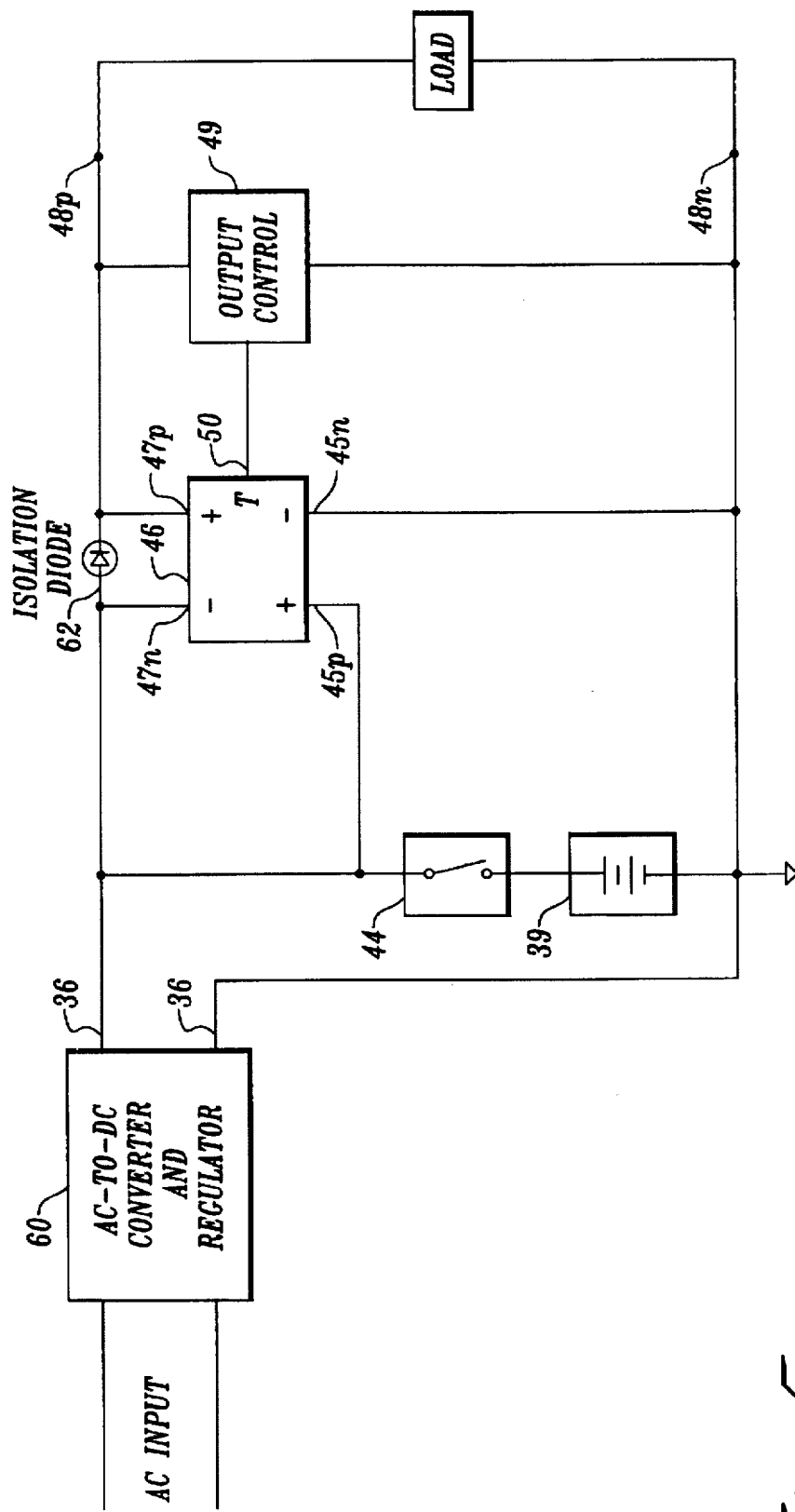
FIG. 5 is a block diagram of another alternative embodiment of the power supply for cellular communication stations in accordance with the present invention.

FIG. 5 shows another possible modification which would eliminate the need for the dual output from an AC-to-DC converter 60. As for the FIG. 4 embodiment, the battery charging voltage would be supplied at the DC output 36, the same as the voltage supplied to the load. Again, a switch 44 is normally closed for charging the backup battery or batteries 39 (i.e., during AC operation) and is opened only if the battery output decreases below the minimum safe value during battery operation. The differential converter 46 has its input terminals 45n and 45p connected in parallel with the battery, and its output at terminals 47n and 47p connected in series. The control circuit 49 causes the differential converter to adjust its output as necessary to maintain the optimum aggregate output voltage at terminals 48n and 48p. No power is processed by the converter during AC operation. Rather, direct current from the AC-to-DC converter 60 is supplied at terminals 48p along the bypass branch 62.

By generating only the differential voltage required to boost the battery voltage to the optimum level, several advantages are achieved. The differential converter can be much smaller than a converter processing the entire output voltage. Minimal additional weight and heat are added, and the reliability of AC operation is not jeopardized. The increase in cost is much less than would be required if a full size DC-to-DC converter were added between the output of the power supply and the input of the cell site electronics.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a system for supplying a DC voltage to a load, such system having an AC-to-DC converter, adapted to receive an AC line input, for normally supplying a regulated DC output to the load, and a backup system for supplying DC power to the load during AC power interruption, the improvement comprising the backup system including:

a backup battery producing a DC output voltage;

a differential DC-to-DC converter having a power input connected in parallel with the battery for receiving power therefrom and an output connected in series with the battery, the battery voltage and said differential DC-to-DC converter output supplying an aggregate voltage to the load;

a sensing circuit for measuring the aggregate voltage supplied to the load and for sending a control signal to the differential DC-to-DC converter, the differential DC-to-DC converter adjusting the voltage of its output based on the control signal for maintaining the aggregate output voltage at a predetermined value.

2. A system for providing a desired DC voltage to a load, comprising:

a battery producing a DC output voltage;

a differential converter coupled to the battery to receive power therefrom and producing a DC differential output voltage that is summed with the output voltage of the battery and provided to the load, the differential voltage varying based on a control signal received on a control input of the differential converter;

a feedback circuit coupled across the load and to the differential converter, the feedback circuit measuring a voltage applied to the load and producing said control signal that is applied to the control input of the differential converter to vary the differential voltage produced by the converter and maintain the voltage applied to the load at a desired level.

* * * * *